I. A. MANN, DEC'D.
M. P. MANN, EXECUTRIX.
PIPE CONNECTION.
APPLICATION FILED MAY 18, 1916.
1,277,976.
Patented Sept. 3, 1918.
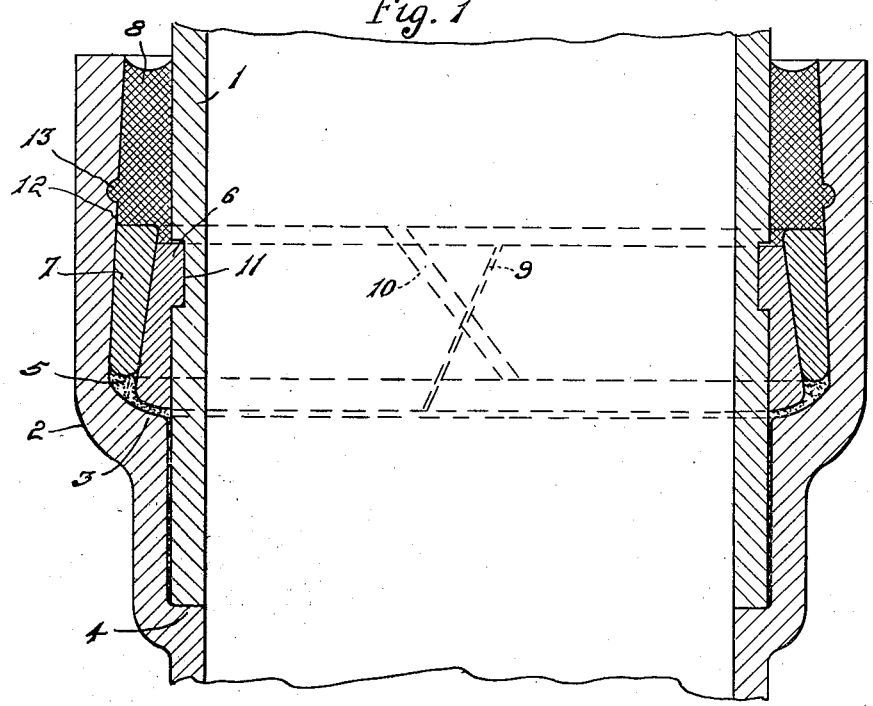
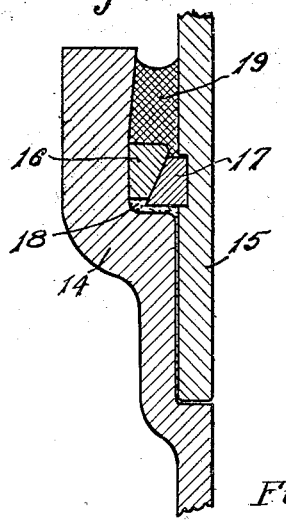
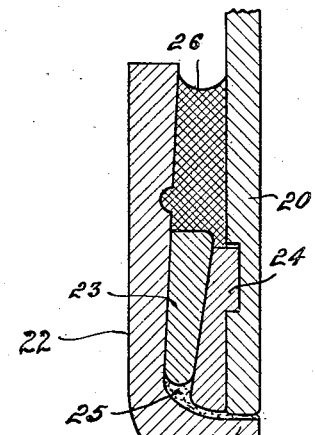
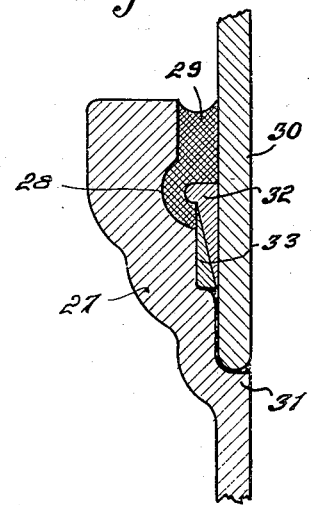
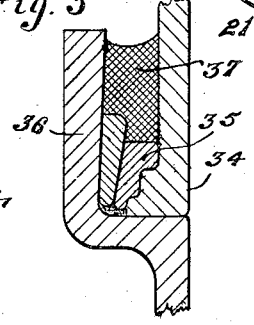
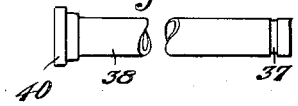

UNITED STATES PATENT OFFICE.

IRA A. MANN, OF PITTSBURGH, PENNSYLVANIA; MARION P. MANN EXECUTRIX OF SAID IRA A. MANN, DECEASED.

PIPE CONNECTION.

1,277,976.         Specification of Letters Patent.     Patented Sept. 3, 1918.

Original application No. 45,863, filed August 17, 1915. Divided and this application filed May 18, 1916.
Serial No. 98,267.

*To all whom it may concern:*

Be it known that I, IRA A. MANN, a citizen of the United States, residing at Pittsburgh, in the county of Allegheny and State of Pennsylvania, have invented certain new and useful Improvements in Pipe Connections, of which the following is a specification.

The invention relates to pipe connections of the type illustrated in my co-pending application, Serial No. 45,863, filed August 17, 1915, as to certain features of which the present application constitutes a division, and particularly to connections for use with cast iron pipe. The invention has for its primary objects the provision of an improved joint connection, (1) wherein means are provided for securely maintaining the pipe ends against separation; (2) wherein lateral bending or buckling at the joint is avoided; (3) wherein no special end for the pipe fitting into the hub is required except such as can be provided at the point where the pipe is fitted and installed; (5) which is cheap, easily applied and sanitary; and (6) wherein any lead is prevented from working into the piping or out of the joint. Certain embodiments of the invention are illustrated in the accompanying drawings, wherein—

Figure 1 is a section through one form of connection, Figs. 2, 3, 4 and 5 are partial sections through modifications, and Fig. 6 is a side elevation of a section of cast pipe which may be employed.

Referring to the construction of Fig. 1, the reference numeral 1 designates one pipe end; 2 is the hub of the other pipe end having the shoulders 3 and 4; 5 is the cement; 6 and 7 are wedging rings; and 8 is a packing of soft metal, such as lead or some composition containing lead.

The pipe 1 is held against outward movement with respect to the hub by means of the wedging rings 6 and 7, preferably of some relatively hard metal, such as brass or iron. These rings are split, as indicated at 9 and 10, and the inner ring 6 is provided with a portion which interlocks in a groove 11 in the surface of the pipe 1. The cement 5 may be of any of the ordinary compositions commonly used in plumbing, preferably of such character that it will harden quickly, and is applied before the ring 7 is forced down into wedging position. After the pipe and ring 6 are positioned and the cement applied, the ring 7 is driven tightly into wedging position, thus locking the pipe 1 against longitudinal movement. The lead 8 is then applied by pouring or in any other desired manner and is tamped tightly into position.

The wedging rings 6 and 7 act to securely lock the pipe and hub in position, and the lead 8 above these members still further reinforces this locking action, since the wedge 7 cannot move outwardly as long as it is held by the lead. The wall 12 of the hub is inclined so as to still better retain the wedge and the lead, and a recess 13 is also provided to give additional security to the lead packing.

The cement 5 serves as a packing and prevents any of the lead from working down between the hub and the pipe and into the interior of the joint. It also serves to make a more perfect fit between the inner end of the pipe 1 and the portion of the hub of smaller diameter. The provision of this portion of smaller diameter is advantageous as it prevents any lateral bending or buckling of the pipe line at the joint, and takes the strain incident to any tendency of the line to buckle off of the packing. There is thus no tendency to loosen the packing and the joint is made very stiff and rigid.

The interlocking of the inner ring with the pipe and the securing of the wedging rings by the packing gives a very positive locking of the two parts of the joint together, so that the joint will stand a heavy tensional strain without pulling apart. This arrangement eliminates any tendency of the lead to work out of the joint and permit a leak, such as is the case where the parts of a joint are not positively held, and there is a backward and forward movement of one joint member with respect to the other. The shoulder 4 forms a positive stop for the end of the pipe 1, and the other shoulder 3 serves as a stop or retaining means for the packing and securing devices. The construction permits of the cutting of the pipe to fit the work since it is a simple matter to machine the slot 12 when the pipe is cut to length, and this can be done either at the shop or at the job.

Fig. 2 illustrates a modification in which 14 is the hub member and 15 the pipe, the parts being wedged by means of the rings 16 and 17, the ring 17 fitting in a groove in the surface of the pipe 15. Cement 18 and lead packing 19 are employed as in the other type of construction, and the wall of the hub is inclined so as to prevent the lead from working out.

The construction of Fig. 3 is the same as that of Fig. 1 except that the hub is not provided with the portion of smaller diameter, the end of the pipe 20 fitting against the shoulder 21 of the hub 22. The holding rings 23 and 24, the cement 25 and the lead 26 are similar to corresponding parts in Fig. 1.

Fig. 4 illustrates another modification wherein the hub 27 is provided with a recess 28 for holding the lead 29, the pipe 30 abutting a shoulder 31 and being held in position by means of the wedge rings 32 and 33.

Fig. 5 illustrates a modification of the construction of Fig. 3 wherein 34 is the hub of an ordinary cast pipe and 35 and 36 are the hard metal wedges held in place by the lead 36. This has the disadvantage that pipe sections which have to be cut to length lack the hub for interlocking with the wedge 35.

Fig. 6 illustrates a section of cast pipe 38 which may be employed, such pipe having the groove 39 and hub 40 formed in the casting operation. This is a new type of pipe.

What I claim is:

1. In combination in a pipe joint, a pipe, a hub into which the pipe fits with the hub wall spaced away from the wall of the pipe, hard metal wedge means between the two walls adapted to wedge laterally and grip the said walls when it is forced inward, a cement between the two walls inward of the wedge means, and a soft metal packing between the two walls outward of the wedge means.

2. In combination in a pipe joint, a pipe provided with a shoulder, a hub into which the pipe fits with the hub wall spaced away from the wall of the pipe, a hard metal ring located outwardly from and engaging the shoulder and lying in the space between the walls, and a soft metal packing in said space outwardly of the ring.

3. In combination in a pipe joint, a pipe provided with a shoulder, a hub into which the pipe fits with the hub wall spaced away from the wall of the pipe, a hard metal ring located outwardly from and engaging the shoulder and lying in the space between the walls, wedge means between the ring and the wall of the hub, and a soft metal packing in said space outwardly of the ring and wedge means.

4. In combination in a pipe joint, a pipe provided with a shoulder, a hub into which the pipe fits with the hub wall spaced away from the wall of the pipe, a hard metal ring located outwardly from and engaging the shoulder and lying in the space between the walls, a wedge ring between the first ring and the wall of the hub, and a soft metal packing in said space outwardly of the rings.

5. In combination in a pipe joint, a pipe provided with a shoulder, a hub into which the pipe fits with the hub wall spaced away from the wall of the pipe, a hard metal ring located outwardly from and engaging the shoulder and lying in the space between the walls, wedge means between the ring and the wall of the hub, and a soft metal packing in said space outwardly of the ring and wedge means, the wall of the hub being provided with retaining means for the soft metal packing.

6. In combination in a pipe joint, a pipe provided with a shoulder, a hub into which the pipe fits with the hub wall spaced away from the wall of the pipe, a hard metal ring located outwardly from and engaging the shoulder and lying in the space between the walls, a wedge ring between the first ring and the wall of the hub, and a soft metal packing in said space outwardly of the rings, the wall of the hub being provided with retaining means for the soft metal packing.

7. In combination in a pipe joint, a pipe, a hub into which the pipe fits with the hub wall spaced away from the wall of the pipe, the surface of the pipe being provided with a circumferential groove, a hard metal ring interlocking with said groove and lying in the space between the walls, and a soft metal packing in said space outwardly of the ring.

8. In combination in a pipe joint, a pipe, a hub into which the pipe fits with the hub wall spaced away from the wall of the pipe, the surface of the pipe being provided with a circumferential groove, a hard metal ring interlocking with said groove and lying in the space between the walls, wedge means between the ring and the wall of the hub, and a soft metal packing in said space outwardly of the ring and packing means.

9. In combination in a pipe joint, a pipe, a hub into which the pipe fits with the hub wall spaced away from the wall of the pipe, the surface of the pipe being provided with a circumferential groove, a hard metal ring interlocking with said groove and lying in the space between the walls, a wedge ring between the ring and the wall of the hub, and a soft metal packing in said space outwardly of the ring and packing means.

IRA A. MANN.